Patented Dec. 4, 1951

2,577,587

UNITED STATES PATENT OFFICE 2,577,587

PROCESS FOR RECOVERING WAX FROM SUGAR CANE

Victor Merz, Burton-upon-Trent, England

No Drawing. Application November 12, 1949, Serial No. 126,929. In Great Britain April 14, 1949

6 Claims. (Cl. 260—412.5)

This invention relates to the separate recovery of hard wax and fatty byproducts from filter residues from sugarcane refining commonly known as muds or cachaza.

Several methods have become known for the separation of the soft fatty constituents from the high melting point wax contained in the sugarcane filter cake. All these methods involve extracting the crude wax from the filter cake and the subsequent separation of the fatty components contained therein either by diffusion with a selective fat solvent of the ketone type from the solidified crude wax in chipped form, or crystallising the crude wax, dissolved in a selective solvent or solvent mixture under cooling and separating the solution containing the fatty constituents by filtration and the like.

As can be seen all these methods involve two distinct extraction processes, one for the recovery of crude wax, the other for the separation of the fatty constituents from the crude wax. Besides in several processes which became known, the wax has to be broken up into small pieces, in order to have the greatest possible surface and thus achieve an efficient leaching of the fatty constituents. The solvents used for the separation of the latter from the crude wax are usually ketones, which are not only expensive, but also soluble in water, thereby causing high solvent losses and making the process uneconomical.

The main object of the present invention is to separate the fatty matter and the wax by selective extraction directly from the filter cake. In the said filter residues, wax and fatty substances are in a state of homogeneous mixture and it is for this reason that by selective extraction an easier and more complete separation of the fatty constituents can be achieved than by separating the fatty constituents from the wax. Moreover, the filter cake itself represents an excellent filter aid, which facilitates the flow of the solution. I have found that certain solvents, particularly paraffin hydrocarbons, will dissolve the soft fatty substances when applied at normal room temperature and the hard waxy matter at or near the boiling point of the solvent used. Thus it is possible to achieve a complete extraction and separation of the fatty matter and the wax from sugarcane filter cake within one operation and by using one solvent only. This process can be performed in any extraction plant of suitable design.

Example 1

100 grams of air dry sugarcane filter mud were treated at 16° C. with 800 cc. commercial hexane, boiling range 70–75° C., of which 200 cc. were absorbed by the filter cake. The solution obtained yielded upon evaporation of the solvent 2.4 grams of dark greenish soft fatty matter. The residual filter cake, soaked with solvent, was then submitted to extraction near the boiling point of the commercial hexane and upon evaporation the solution yielded 12.6 grams of dark brown wax of a melting point of 77° C.

Example 2

100 grams of sugarcane filter mud of the same origin were treated with 250 cc. trichlorethylene at 19° C. and yielded 2 grams of soft fatty matter. The subsequent extraction near the boiling point of trichlorethylene yielded 13.9 grams of wax of a melting point of 75° C.

Example 3

100 grams of sugarcane filter mud of the same origin were treated with 800 cc. of a petroleum spirit boiling between 90–105° C., at 12° C. and yielded 1.54 grams soft fatty matter. The residual filter mud was then submitted to treatment with the vapours of the same petroleum spirit, which were condensed in the sugarcane filter mud and the solution formed returned to the evaporating still. The solution thus obtained contained 13.6 grams of wax of a melting point of 76° C.

If desired, the described treatment can also be performed with other solvents or solvent mixtures, which dissolve the fatty matter at lower temperature, but will dissolve the bulk of the waxy constituents only at elevated temperature. The actual temperature at which the fatty constituents are recovered varies according to the selectivity of the solvent or solvent mixture applied.

What I claim and desire to secure by Letters Patent is:

1. A process for the separate recovery of high melting point wax and fatty substances direct from sugarcane filter residues commonly known as muds or cachaza characterised by extracting the said filter residues preferably air-dry with a selective organic solvent, first at a predetermined temperature at which the organic solvent dissolves the bulk of the fatty substances without dissolving the wax, separating the solution of the fatty substances from the residue and then extracting the residue with the same solvent at a higher temperature, near the boiling point of the solvent, whereby the hard wax is dissolved, collecting the solutions of fatty substances and wax in separate receptacles and then distilling off the solvent from said receptacles to obtain the fatty substance and hard wax respectively.

2. A process according to claim 1 in which the solvent used is a paraffin hydrocarbon containing at most 10 carbon atoms in the molecule.

3. A process according to claim 1 in which the solvent used is a halogenated hydrocarbon.

4. A process according to claim 2 in which the solvent is commercial hexane.

5. A process according to claim 2 in which the solvent is commercial heptane.

6. A process according to claim 2 in which the solvent is a petroleum spirit having a boiling point between 90° and 105° C.

VICTOR MERZ.

REFERENCES CITED

The following references are of record in the file of this patent:

UNITED STATES PATENTS

| Number | Name | Date |
| --- | --- | --- |
| 2,391,893 | Joepfert | Jan. 1, 1946 |
| 2,428,813 | Rhodes et al. | Oct. 14, 1947 |